L. Q. PRESBY.
LENS CUTTING MACHINE.
APPLICATION FILED JUNE 11, 1921.
1,417,468. Patented May 23, 1922.
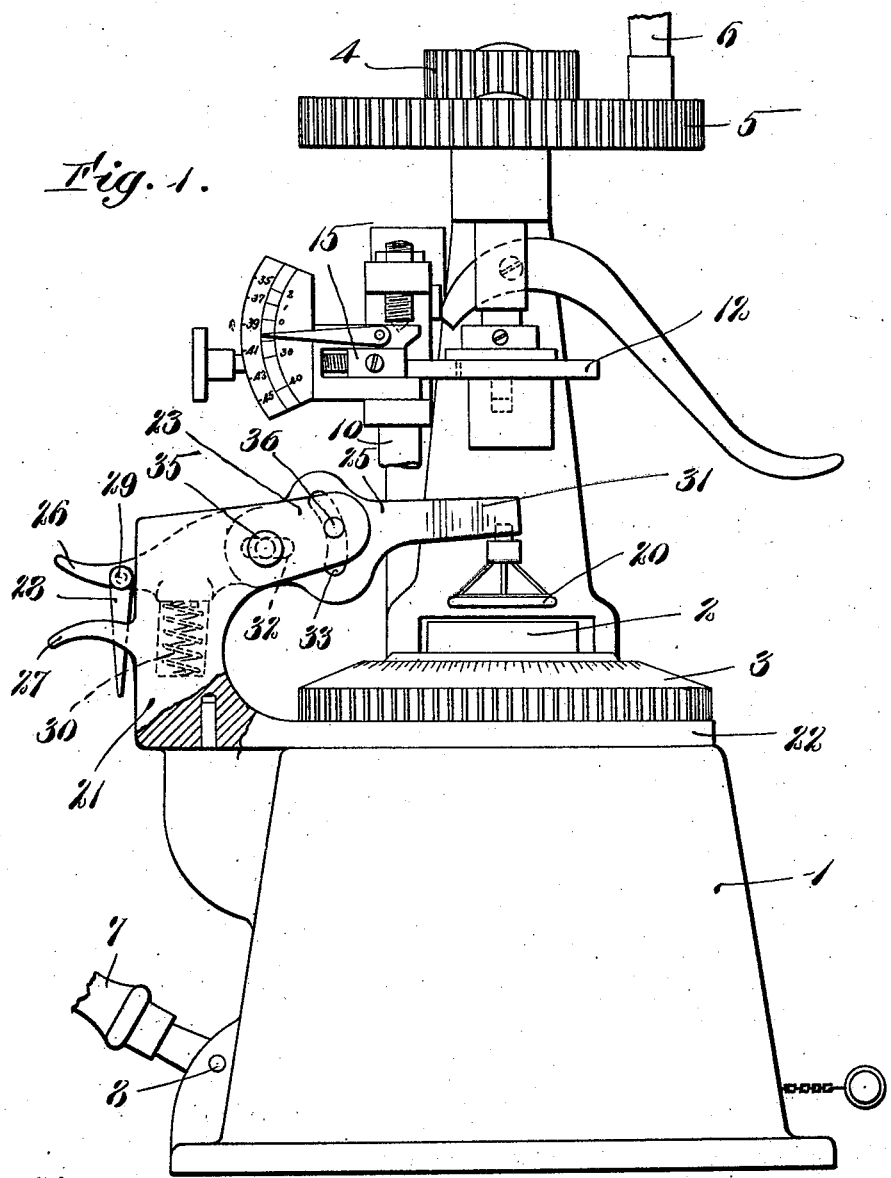
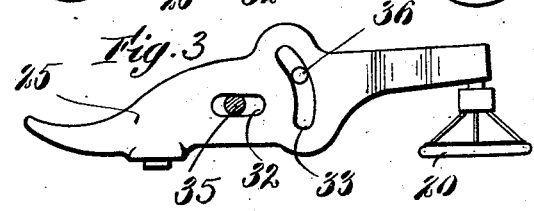
Inventor:
Leroy Q. Presby
by James R. Hodder
Atty.

UNITED STATES PATENT OFFICE.

LEROY Q. PRESBY, OF BOSTON, MASSACHUSETTS, ASSIGNOR TO GLOBE OPTICAL COMPANY, A CORPORATION OF MASSACHUSETTS.

LENS-CUTTING MACHINE.

1,417,468.    Specification of Letters Patent.    Patented May 23, 1922.

Application filed June 11, 1921. Serial No. 476,934.

*To all whom it may concern:*

Be it known that I, LEROY Q. PRESBY, a citizen of the United States, and resident of Boston, in the county of Suffolk and State of Massachusetts, have invented an Improvement in Lens-Cutting Machines, of which the following description, in connection with the accompanying drawings, is a specification, like letters on the drawings representing like parts.

My present invention is an improved lens cutting machine and relates particularly to the lens holding devices.

In the type of lens cutting machine illustrated by the prior U. S. patent to L. Wilhelm, No. 1,186,254, dated June 6, 1916, and in the patent to W. W. Slade, No. 1,388,774, Aug. 23, 1921, it has been found that, in practise, the glass holding devices being pivoted eccentrically of the center, permitted a slight disalinement of the cutter and glass during the initiation of the cutting action. With the work holding member adapted to clamp the glass to be cut upon a work support, which member was pivoted at one side of the work, and arranged to permit vertical movement with the raising of the work against the cutter, it was found that the cutter would not always trace a true concentric circle on the glass during the continued vertical movement of the work and work holder. While this objection has been immaterial in many instances where but a slight vertical movement was necessary, yet in other cases where a considerable vertical movement was required between the first clamping of the lens and the completion of the cutting action, a considerable disalinement was possible. My present invention is directed to obviate the difficulties above noted, and to permit the use of a work clamping device pivoted at one side of the work holder and preferably movable or rotatable to allow better view and vision of the cutting operation, and also to compensate for the disalinement heretofore found in prior clamping members which were necessarily pivoted at one side.

In my present invention I have devised a work clamping member suitable for being mounted on a rotatable portion of the machine, and which member will itself move vertically in exact alinement with the vertical movement of the work support during the cutting operation, thus insuring a true and exact cutting of the lens. In order to carry out my said invention I have provided a clamp holding arm secured at one side of the work—to permit view and facilitate the cutting operation, etc.,—and which is secured on a plurality of pivot points, each working in a properly formed cam path or slot, so as to positively move the clamp holding arm inwardly or outwardly in exact relation and proportion to the vertical movement of the work and lens, thus maintaining at all times the lens clamping member in concentric position with the cutter, and insuring a consequent cutting action on the lens in exactly the same circle, loops or form of the model employed in these machines.

Referring to the attached drawings illustrating a preferred embodiment of the invention;

Fig. 1 is a side view, partly in cross-section, illustrating my invention as applied to the lens cutting machine of the kind and type shown in said Slade patent;

Fig. 2 is a plan view of the clamp carrying arm; and

Fig. 3 is a side view of the arm.

While I have shown in the drawings my invention as applied to a lens cutting machine, and although this is a primary and important use to which the present invention has been applied, yet it will be appreciated that my invention, broadly considered, can be applied with equal advantage, to other machines or devices, wherein a clamping member is mounted on an overhanging arm, which arm is secured at one side of the work, and wherein a vertical movement of the clamping member, together with its holding arm, is necessary in the operation of the machine. My invention enables this vertical movement to be carried out with a large range and to positively move the clamp carrying arm inwardly or outwardly to compensate for the vertical movement required, and thus eliminate the "dragging" action of the holding arm on its clamp where the holding arm was originally pivoted and had a substantial swinging action during the machine operations.

Referring to the drawings, I have designated in conventional form a lens cutting machine of the type of the said Wilhelm and Slade patents, wherein a base 1 carries a rotatable work support 2 mounted for rotation on a gear wheel 3 and with suitable connections to upper gears 4 and 5, operated manually or otherwise by a handle 6. A lever 7, pivoted at 8 in the base 1 serves by suitable connections to raise and lower the work support 2 against a cutter (not shown) held in a cutter holding shaft 10, which cutter is movable inwardly and outwardly to follow the contour of a pattern 12. The cutter holding devices provide an adjustable slide 15 contacting against the edge of the pattern 12 and controlling the movements of the cutter shaft 10 and its cutter upon the work, which latter is held clamped between a top clamping member 20 and the work support 2.

My invention has to do particularly with the holding of this upper clamping member 20, which, it will be appreciated, must be raised and lowered with the glass to be cut, held between said clamp 20 and the work support 2, as the work support, the glass thereon, and the clamp 20 are raised upwardly by depression of the lever 7 against the cutter.

I provide a bracket member 21 mounted upon a circular plate 22 and thus permitting movement of the bracket 21 and the arm holding the clamp 20 around the work as desired, forming this bracket 21 with a forwardly extending pair of arms 23, and spaced a sufficient distance to hold between them a lever 25. This lever extends forwardly and has a ball joint or other suitable universal movable connection with the clamp 20, permitting the clamp 20 to automatically seat itself on the work when the clamp is lowered thereon. This lever 25 is also formed with a rearwardly extending operable portion 26, to facilitate the action of the thumb of the operator in raising the lever and removing the clamp 20 from the work, a corresponding finger rest 27 being secured to the bracket 21 and a latch member 28 pivoted to the lever 25 at 29 being also provided to hold the lever 25 in raised position when desired to remove or replace work. A spring 30, shown in dotted lines, Fig. 1, normally acts to hold the arm 25 with the clamp 20 pressed yieldingly against the work.

I form the lever 25 preferably with a slight curved portion as shown at 31 for clearance around the cutter and a better view, and also cut in this lever a pair of cam paths 32 and 33. These cam paths or slots receive rods 35 and 36 respectively which are held rigidly in the spaced arms 23 at either side of the lever 25 and permit the pivotal action of the lever 25 during the raising and lowering of the clamp 20 under the action of the spring 30 or while compressing said spring and the raising of the lever as above explained, but also these cam paths and the studs 35 and 36 engaging the same, are so formed, constructed and arranged as to give a forward and backward thrust or movement to the entire arm, sufficient to exactly compensate for the shortening and lengthening of the outermost end where the clamp 20 is attached, which would be the effect were the clamp 20 rigidly pivoted at a single point. This construction, therefore, permits the clamp 20 to be readily raised and lowered during the raising and lowering of the work against the cutter with a considerable range of vertical movement without displacing the exact position of the clamp 20 to which it has settled when clamping the work onto the work support, preventing any dragging of the clamp 20 from its original position by the raising and lowering of the lever 25.

It will be appreciated that I am enabled to thus accurately and positively compensate for the disalinement which would be and heretofore has been caused by the raising and lowering of the lever 25 if fixed on a rigid pivot, such disalinement increasing during the greater extent of this vertical movement as the clamp 20 is lifted or lowered from a strictly horizontal position. Perfect precision is thus accorded the cutting machine during the raising and lowering of the work.

My invention is further described and defined in the form of claims as follows:

1. In a machine of the kind described, a work support thereon, a bracket mounted on the base and at one side of the work support, studs on said bracket, a lever, and a work clamp adapted to be held and supported by said lever, said lever having cam slots co-operating with the studs on the bracket to limit the clamp to movement in a vertical direction.

2. In a lens cutting machine, having a base, a vertically movable work support thereon, a bracket on said base and positioned at one side of the work support and adapted to rotate therearound, said bracket having a pair of extending arms, a lever positioned between said arms, and extending concentrically over the work support, said lever being provided with a pair of cam slots, a clamp carried by the lever in position to cooperate with said work support, and a pair of fixed studs extending through said cam paths and carried by the bracket arms so constructed and arranged as to move the clamp carrying lever elliptically and limit the clamp to vertical movement only during the vertical movement of the work support.

In testimony whereof, I have signed my name to this specification.

LEROY Q. PRESBY.